United States Patent [19]

Fapiano

[11] Patent Number: 5,103,662
[45] Date of Patent: Apr. 14, 1992

[54] TANDEM ROLLING MILL TENSION CONTROL WITH SPEED RATIO ERROR DISCRIMINATION

[75] Inventor: Donald J. Fapiano, Salem, Va.

[73] Assignees: Allegheny Ludlum Corporation, Pittsburgh, Pa.; Fapiano Consulting, Inc., Salem, Va.

[21] Appl. No.: 517,117

[22] Filed: May 1, 1990

[51] Int. Cl.⁵ .......................................... B21B 37/00
[52] U.S. Cl. ........................................... 72/6; 72/19; 72/205
[58] Field of Search ........... 72/8, 11, 14, 15, 16, 72/17, 19, 6, 20, 21, 29, 205, 234; 364/472

[56] References Cited

U.S. PATENT DOCUMENTS

| | | | |
|---|---|---|---|
| 3,786,661 | 1/1974 | McKee et al. | 72/19 |
| 3,848,443 | 11/1974 | Peterson et al. | 72/17 |
| 3,863,478 | 2/1975 | Harada et al. | 72/6 |
| 3,940,960 | 3/1976 | Tanifuji et al. | 72/19 |
| 4,087,859 | 5/1978 | Anbe | 72/8 |
| 4,126,028 | 11/1978 | Chapront | 72/19 |
| 4,240,147 | 12/1980 | Morooka et al. | 72/8 |
| 4,292,825 | 10/1981 | Morooka et al. | 72/19 |
| 4,460,852 | 7/1984 | Kondo et al. | 72/8 |
| 4,691,546 | 9/1987 | Clegg | 72/17 |
| 5,012,660 | 5/1991 | Peterson et al. | 72/19 |

OTHER PUBLICATIONS

Thickness Control in Cold Rolling, D. J. Fapiano and D. E. Steeper, Iron and Steel Engineer, Nov. 1983.
New Approaches for Cold Mill Gage Control, W. D. King and R. M. Sils, AISE Yearly Proceedings, 1973, p. 187.
The Calculation of Roll Force and Torque in Cold Strip Rolling with Tensions, Bland, D. R. and Ford, H., Proceedings of the Institute of Mechnical Engineers, vol. 159, 1948, pp. 144-153.

*Primary Examiner*—Lowell A. Larson
*Assistant Examiner*—Thomas C. Schoeffler
*Attorney, Agent, or Firm*—Patrick J. Viccaro

[57] ABSTRACT

A method is provided for controlling interstand tension by roll gap adjustment to reduce gage variations caused by unplanned rolling velocity changes wherein a signal proportional to the tension changes produced by deviations from the desired speed ratio of adjacent stands is used to modify the conventional tension error signal before the latter signal is used to control roll gap thereby discriminating between tension changes caused by mill stand or strip physical changes, which it corrects, and tension changes caused by unplanned speed disturbances, which it ignores instead of maintaining constant tension. The resulting system exhibits improved tolerance for imperfect stand speed control.

6 Claims, 4 Drawing Sheets

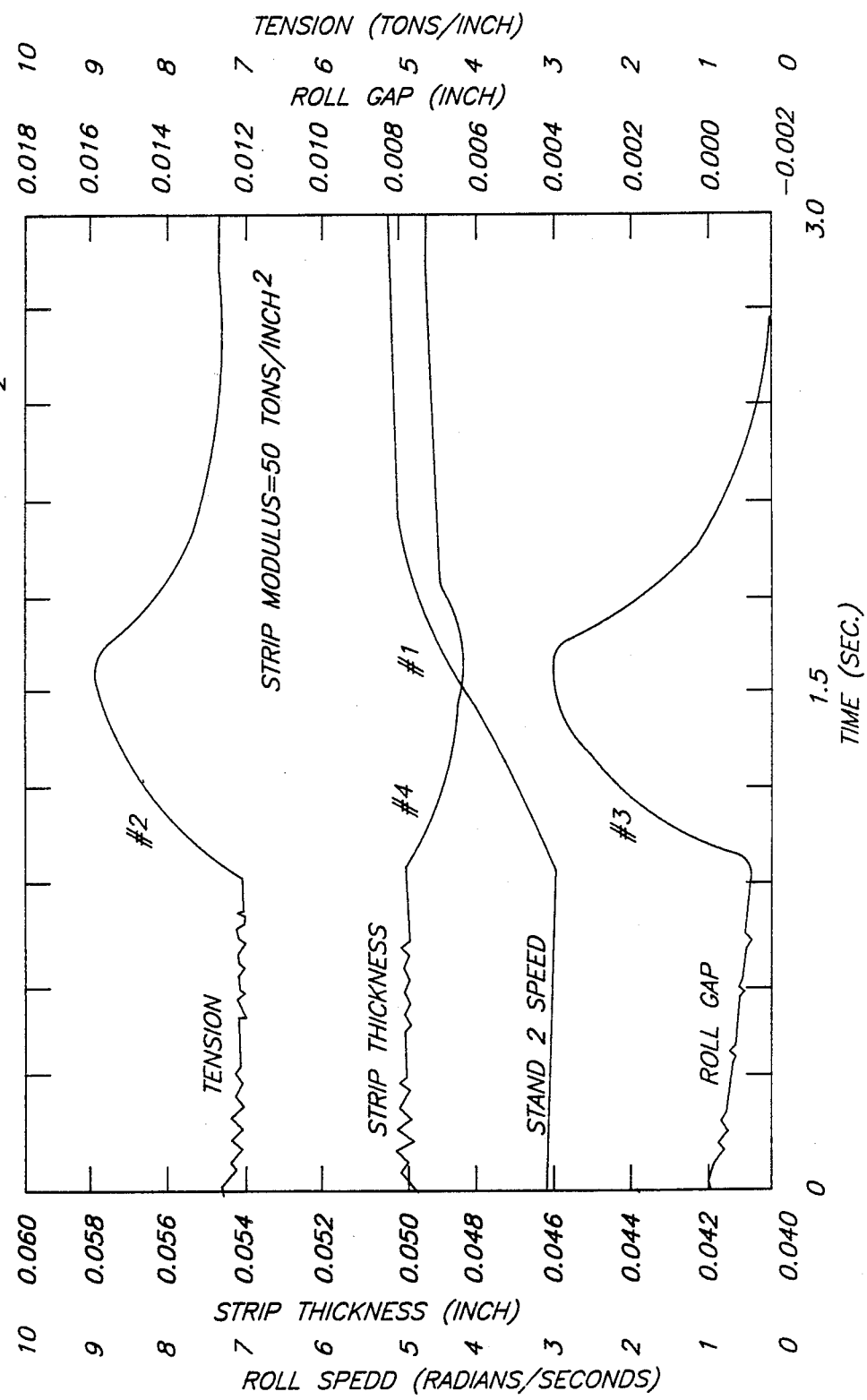

TANDEM ROLLING MILL TENSION CONTROL WITH SPEED RATIO ERROR DISCRIMINATION

BACKGROUND OF THE INVENTION

The present invention relates generally to multistand metal rolling mills, and more particularly to a method of improved control of interstand tension in such mills.

Multi-stand cold rolling mills equipped with interstand tensiometers generally employ two forms of interstand tension control, i.e., by stand speed and by roll gap. During threading, tension is commonly controlled by stand speed adjustments. When the strip has entered all stands and the exit reel, the mill is accelerated from threading speed to run speed; the tension control method is transferred from stand speed control to roll gap control, and stand speeds are restored to the values required for the target thickness and desired reduction pattern.

Accurate control of strip thickness is not possible before the transition from tension control by speed to tension control by gap, and it is therefore essential that this occur as early as possible in the rolling process. In practice, the transition to tension control by roll gap usually occurs at or close to thread speed in order to reduce the amount of off gage strip. These control strategies and operating practices are well known and have been thoroughly described in the rolling literature, for example "Thickness Control in Cold Rolling" by D. J. Fapiano and D. E. Steeper, Iron and Steel Engineer, November 1983, and "New Approaches to Cold Mill Gage Control" by W. D. King and R. M. Sills, AISE Yearly Proceedings, 1973, p. 187.

While tension control by roll gap adjustment is widely used and generally effective, its effectiveness depends upon good control of stand speeds. Control of tension by roll gap produces uniform strip thickness if, and only if, stand speed relationships are maintained constant. Under this condition, any change in tension can properly be attributed to a change in strip thickness, which will then be corrected when the roll gap is changed to restore tension to the desired level.

The principal weakness in prior art embodiments of this strategy is that any unplanned change in stand speed produces thickness errors. For example, if during acceleration, imperfect speed control causes the upstream stand speed to fall relative to the downstream stand speed, strip tension between the stands would increase. If no tension control action occurred, strip thickness leaving the downstream stand would decrease slightly because of the entry tension increase. With tension control by gap, the tension regulator would close the downstream stand roll gap to restore tension to the reference level, thereby further reducing strip thickness. This vulnerability to speed control errors has focused attention on needed improvements in main drive speed control in new or recently modernized mills. However, a large number of existing mills employ drive and control equipment of older design whose speed accuracy cannot be improved at an acceptable cost.

Field experience has shown that speed ratio errors of 3% to 5% are common during low speed accelerations through the roll stands. When tension control is by roll gap, such errors result in strip thickness errors of a corresponding amount. Off-gage strip results in loss of saleable strip. The problem is most severe at low speed, since load disturbances of a given magnitude produce larger per-unit speed disturbances at lower speeds. The interstand tension change is proportional to the change in interstand strain which results from changes in the ratio of adjacent stand speeds. Thus, it is the change in per-unit speed, rather than absolute speed, which determines the resulting tension change.

An alternative strategy would be to continue tension control by speed until some higher speed has been reached. Such a strategy, however, sacrifices control of gage variations resulting from changes in material deformation resistance or from changes in the roll gap caused by roll thermal expansion or backup roll eccentricity.

An ideal tension control method would be one which retains the advantages of tension control by roll gap but reduces or eliminates the sensitivity to speed errors exhibited by previous embodiments of that strategy.

It is, therefore, an objective of the present invention to provide an improved method of rolling metal strip.

It is a further objective to provide a method of strip tension control which reduces strip thickness errors due to unplanned variations in rolling mill speeds.

SUMMARY OF THE INVENTION

In accordance with the present invention a method for controlling tension is provided in a rolling mill having at least two mill stands and means for adjusting the stand roll gap. The method of the present invention controls strip tension between adjacent stands by continuously identifying deviations from the desired stand speed ratio. The tension change resulting from this speed ratio error is estimated from a relationship between tension and speed ratio error. Then a measured tension signal is modified by the amount of this speed-induced tension change. The thus modified tension signal is then used as in the prior art method of tension control by roll gap adjustment.

In effect, the present invention discriminates between tension errors caused by stand speed disturbances and tension errors from all other sources, and corrects only that portion of the tension deviation which is not caused by rolling speed variations.

BRIEF DESCRIPTION OF THE DRAWINGS

FIG. 5 is a computer simulation of gage and tension variations obtained with the present invention using overcompensation of the velocity induced tension change.

DETAILED DESCRIPTION OF THE PREFERRED EMBODIMENTS

Figure 1:
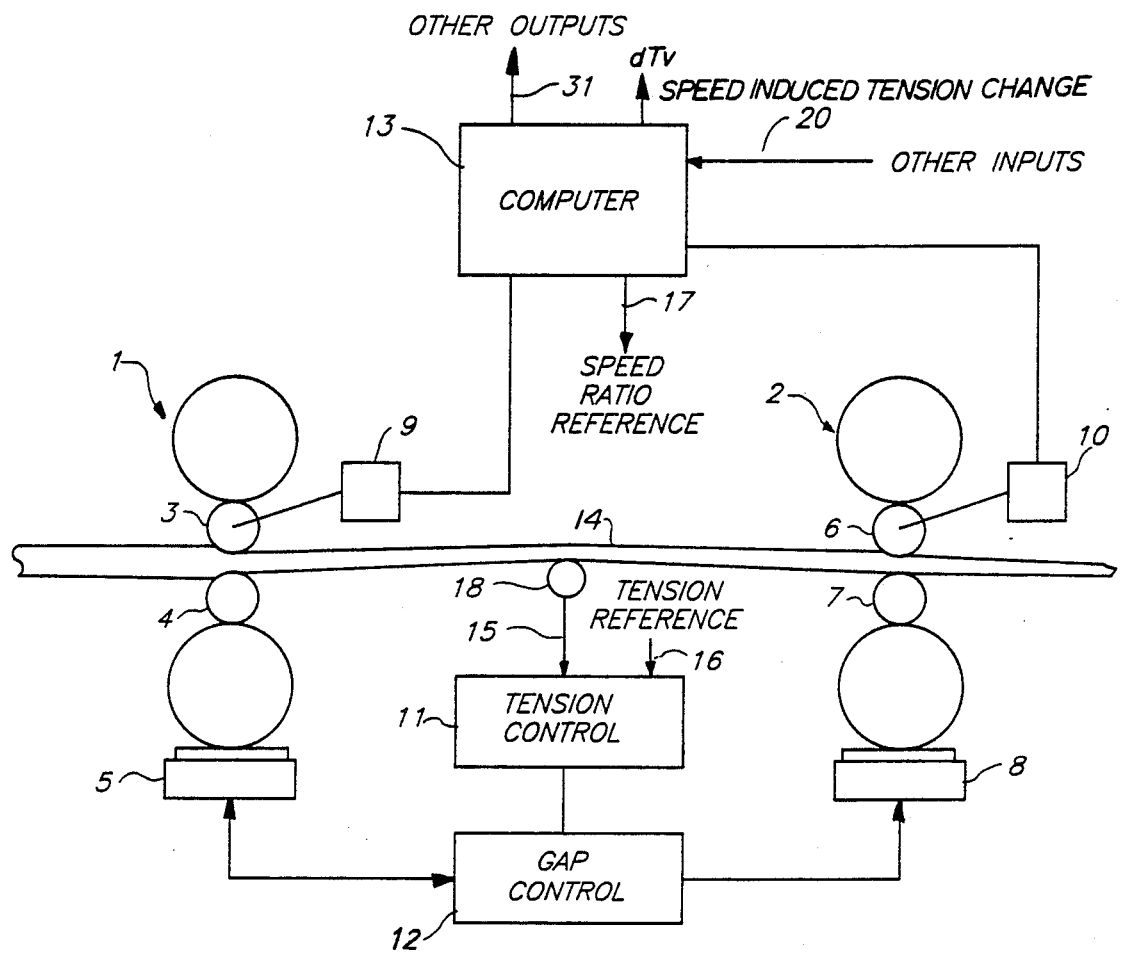
FIG. 1 is a schematic block diagram of the apparatus arrangement for the method of the present invention.

FIG. 1 shows in schematic form a typical pair of adjacent mill stands such as might be employed in the implementation of the method of the present invention. It is to be understood that the depiction of FIG. 1 is simplified to show only the essential elements which are pertinent to the present invention. Further, it is understood that the depiction of FIG. 1 may be any two adjacent stands of a multistand rolling mill.

In FIG. 1, workpiece 14 is passed through opposed workrolls 3 and 4 of a first, upstream rolling mill stand 1 and opposed workrolls 6 and 7 of second, downstream rolling mill stand 2 and passes over tension sensing means 10 situated between the stands. Rolling velocity sensors 9 and 10 are connected to workrolls 3 and 7, respectively, preferably the drive motors of the workrolls. The gap between opposed workrolls 6 and 7 of downstream stand 2 is adjusted by hydraulic cylinder 8 under the control of roll gap control 12. Alternatively, the gap may be adjusted by screws as in most older rolling mills. Control of the gap between opposed workrolls 3 and 4 is provided but control of the gap of the upstream stand 1 is optional and is not necessary to the method of the present invention. Tension control means 11 receives a strip tension signal 15 from tension sensing means 18, compares it to the tension references signal 16 received from computer 13, then directs gap control means 12 to adjust hydraulic cylinder 8 so as to reduce the difference between signals 15 and 16. In controlling interstand tension, it is well known that adjustment of the downstream stand roll gap as is depicted in FIG. 1 is much more effective than adjustment of the upstream stand roll gap.

Reference values to the many control equipments required to operate a multistand rolling mill are typically generated by a set-up computer 13, such as the Digital Equipment Corporation VAX-11-780 computer. The desired ratio of stand velocities 17, which is relevant to the present invention, is among information produced by computer 13. Other inputs not pertinent to the present invention are shown as carried over bus 20 and would include, as well known in the art, such elements as rolling schedule data, operator inputs, etc. Other outputs are shown as carried over bus 31.

Strip tension in the strand of strip 14 between adjacent stands 1 and 2, is produced by a slight strip velocity increase as strip passes between stands. This produces a strain which when multiplied by the strip elastic modulus produces a proportional tensile stress, or tension. Tension can thus be controlled by any procedure which alters the relative speeds at the two ends of the segment of strip 14 between the adjacent stands. The most common method would be to change the rotational velocity of workroll 2 or 6 of the downstream stand 2, in what is herein referred to as tension control by speed. Such a method is commonly employed during initial rolling, i.e., threading, of the strip through all stands before the strip has entered all stands and before acceleration to running speed. For reasons well known in the art, and discussed in the previously cited articles, it is desirable to switch as soon as possible to tension control by gap.

Figure 2:
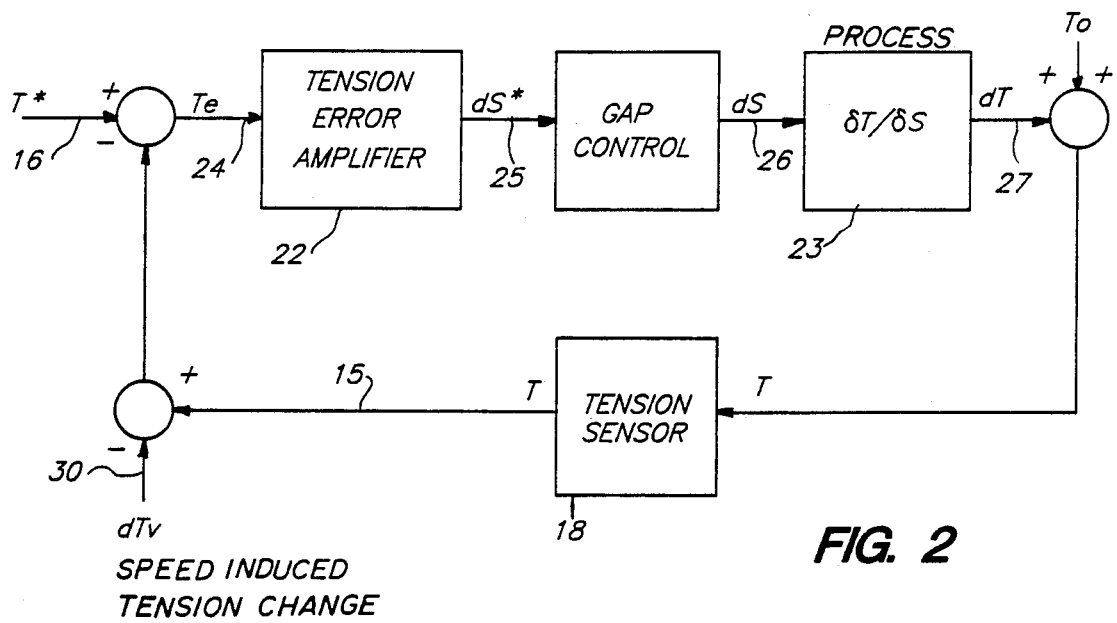
FIG. 2 is a simplified block diagram of a tension regulator acting on the roll gap control.

In the tension control by gap method, the strip velocity (speed) entering the downstream stand is changed by changing that stand's roll gap opening and, thus, the reduction, or draft, in that stand. If, for example, the gap is closed and the reduction increased, the volume flow leaving the stand will decrease and the strip velocity entering the stand must decrease proportionally. In this case, the interstand tension would decrease. The essential elements of tension control by gap are shown in the simplified block diagram of FIG. 2. Tension reference signal 16 is compared with measured tension signal 15 from tension sensor 18 to produce a tension error signal 24. This is converted by tension error amplifier 22 to the roll gap reference 25 causing gap control 12 to adjust the workroll opening. The roll gap change 26 acts through the process transfer function 23 to produce the tension change 27. Signal 30, not present in prior art systems, is described later herein.

The advantage of conventional tension control by gap may be illustrated by the following examples of its response to typical disturbances. Consider the case of an increase in the deformation resistance of an increment of strip entering stand 2. The increase in rolling force would cause an increase in strip thickness leaving stand 2 and a corresponding increase in volume flow, since the rolling velocity remains constant. The strip velocity entering stand 2 therefore must increase, causing an increase in interstand tension. The tension control will act to close the gap between workrolls 6 and 7 of stand 2 to restore tension to the reference value, substantially eliminating the strip thickness error as a result. The tension control response to an unplanned change in gap opening due to thermal expansion of the workrolls or workroll eccentricity, for example, also acts to maintain constant gage. A decrease in exit thickness due to workroll thermal expansion will produce an decrease in volume flow at stand 2 and a corresponding decrease in strip velocity entering stand 2. The resulting decrease in interstand tension causes the tension control to open gap between stand 2 workrolls 6 and 7, restoring both tension and exit thickness to their proper values.

These characteristics of tension control by gap are well known and so are the problems associated with the prior art embodiments of the strategy. As conventionally employed, such systems are dependent on precise control of rolling speeds. Any disturbance to the speed ratio of adjacent stands, caused for example by differences in the responses of stand 1 and 2 speed controllers to a change in speed reference, will produce a change in strip tension. Prior art tension control by gap would act to restore tension by a change in stand 2 workroll gap, thus producing undesirable variations in strip thickness.

Figure 3:
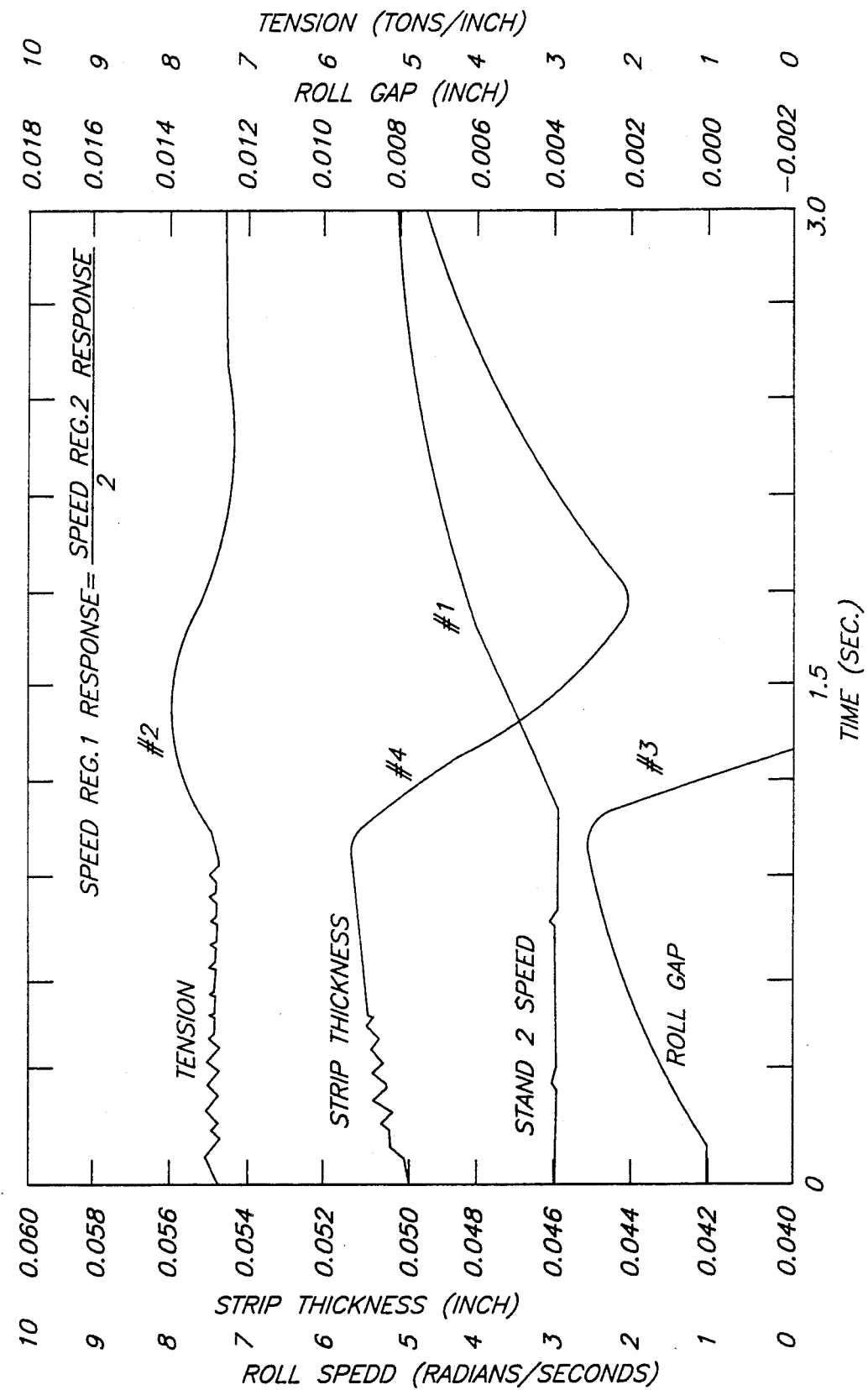
FIG. 3 is a computer simulation of gage and tension variations resulting from prior art tension control during acceleration with mismatched speed regulators.

FIG. 3 illustrates the action of prior art tension control by gap during an acceleration with stand 1 speed control set to provide one-half the speed of response of stand 2. This represents an undesirable but not unknown control situation. The area of interest begins at about 1.2 seconds where acceleration begins. Since stand 1 speed (trace 1) lags behind stand 2 speed, tension (trace 2) increases causing the roll gap (trace 3) to close, producing the decrease of about 0.005 inch in strip thickness (trace 4).

The action of the prior art tension control by gap is obviously inappropriate for such a situation. The tension increase caused by the slow response of stand 1 would have decreased the strip thickness exiting stand 2 if there were no tension control. The tension control action further decreases stand 2 thickness in its attempt to restore tension.

The present invention discriminates between tension changes caused by rolling mill speed, or more particularly speed ratio, and tension changes due to other disturbances. The method continuously compares the actual ratio of adjacent stand rolling velocities with the desired rolling velocity ratio reference 17. Workroll velocity is provided by tachometers or other velocity sensors which are essential to mill speed control. The velocity ratio error, dVR, can be expressed as:

$$dVR = (V1/V2) - (V1R/V2R)$$

| | |
|---|---|
| where: | dVR = speed ratio error |
| | V1 = stand 1 speed |
| | V2 = stand 2 speed |
| | V1R = stand 1 speed reference |
| | V2R = stand 2 speed reference |

The tension change associated with the speed ratio error (also called velocity ratio error) can be determined from the apparent strip modulus, dTdVR. The apparent strip modulus is used rather than the actual strip elastic modulus. Changes in stand speed do not produce equal changes in strip velocity, in the presence of strip tension. When strip tension changes, the neutral point, or point in the roll gap where roll and strip speeds are equal, shifts in a direction to oppose the change in tension. Because of this action, the stand speed change required to produce a given tension change is many times greater than would be predicted using the actual strip modulus of elasticity, i.e., Young's modulus. The apparent strip modulus for tension control purposes must, therefore, be estimated based on equations or algorithms representing the rolling process interactions in the roll bite. For example, "The Calculation of Roll Force and Torque in Cold Strip Rolling with Tensions", Bland, D. R. and Ford, H., Proceedings of the Institute of Mechanical Engineers, Vol 159, 1948, pp. 144–153, provides equations which can be used for this purpose. As most modern rolling mills are equipped with process control computers, it is common practice to generate such transfer functions and gains as may be required for control in these computers and pass the required data to the control equipment. In other cases, the direct control and computation functions may be combined in the same computer.

Where computational power is not sufficient for on line solution of equations such as those of Bland and Ford, simpler algorithms can be used to develop the apparent strip modulus, for example,

| | |
|---|---|
| | dTdVR = 1 / (TERM1 + TERM2) |
| where: | dTdVR = apparent strip modulus |
| | TERM1 = dH / (h2 * (k − (B + F)/2)) * dG/(dG + dH) |
| | TERM2 = 1 / (4 * U * k) * (dH / R')$^{.5}$ |
| | dH = draft at stand 2 |
| | U = friction coefficient at stand 2 |
| | k = yield stress at stand 2 |
| | R' = deformed workroll radius at stand 2 |
| | dG = roll gap load deflection of stand 2 |
| | B = interstand tension |
| | F = exit tension at stand 2 |
| | h2 = exit gage at stand 2 |

By multiplying the velocity ratio error and apparent strip modulus, the velocity induced tension change, dTv, can be found. Thus, $$dTv = dTdVR * dVR$$

In the present invention, the velocity induced tension change, dTv, is subtracted from the measured tension signal 15. Alternatively, it could be added to the tension reference 16 or the tension error signal 24, since these are mathematically equivalent methods.

Figure 4:
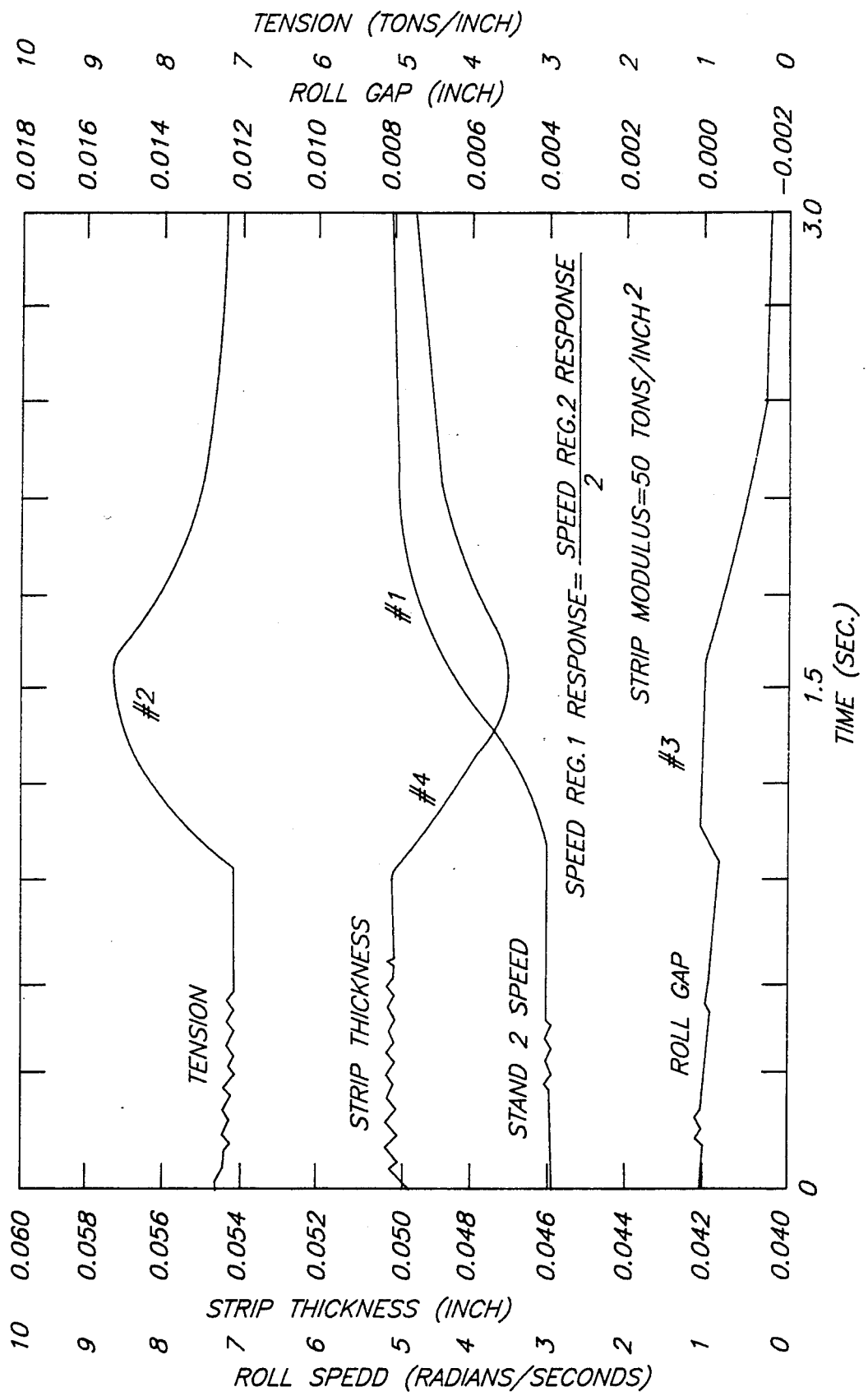
FIG. 4 is a computer simulation of gage and tension variations resulting from tension control in accordance with the present invention.

The effectiveness of the present invention is illustrated by FIG. 4, which repeats the conditions of FIG. 3, but with the velocity induced tension change, dTv, subtracted from measured tension 15. FIG. 4 is a computer simulation of gage and tension variations and represents performance with dTv set close to the theoretically correct value. Tension (trace 2) is allowed to rise uncorrected and little change occurs to the roll gap (trace 3). The gage change (i.e., strip thickness) is reduced to approximately 0.0025 inch or about one half the gage change shown in FIG. 3.

The value of dTdVR need not be precisely known. In fact, superior results were obtained in computer simulations using values substantially higher than the theoretically correct value, so as to provide some reduction of the gage error resulting from the velocity induced tension change dTv. The effect of doubling the value of dTv is shown in FIG. 5 which is a computer simulation repeating the conditions of FIG. 4 except for the dTv. The roll gap (trace 3) opens in response to the speed ratio error and further reduces the gage error to about 0.0015 inch, which is less than one-third the gage error of the prior art method illustrated in FIG. 3.

It is possible to further refine this strategy by calculating the multiple of the value of dTv which completely removes the gage error produced by the velocity ratio error. Considering uncertainties in dTdVR due to variations in friction and neutral point position, further refinement appears unwarranted, since 70% to 80% of the potential improvement can be obtained by use of an arbitrary multiple of about 2.0 on the theoretical dTv.

The present invention is thus seen to eliminate the principal problem with previous methods of tension control by gap, and in a manner which can be readily applied to both new and existing rolling mill tension control systems.

While there has been shown and described what is at present considered to be the preferred embodiment of the present invention, modifications will readily occur to those skilled in the art. For example, while precalculated estimates of the apparent strip modulus, dTdVR, have been described, on-line estimation of that variable would be possible using estimation strategies well known in modern control theory. Further, while the signal dTv is shown as the combination of two signals, it can be developed directly from the elements comprising those two signals. The actual choice between equivalent strategies will normally depend on the computer and control hardware arrangement. It is not desired, therefore, that the invention be limited to the specific arrangement shown and described and it is intended to cover, in the appended claims, all such modifications as fall within the true spirit and scope of the invention.

I claim:

1. A method for controlling interstand strip tension in a metal cold rolling mill having at least two rolling stands, each with at least one pair of opposed workrolls for reducing the thickness of a metal workpiece passed therebetween, tension sensing means for sensing strip tension between adjacent stands, means for sensing the rolling speed of each stand, and tension control means for controlling tension to a desired level by adjusting the gap between opposed workrolls of the downstream stand, a method comprising:

(a) establishing a first control signal proportional to deviations of the actual speed ratio of adjacent upstream and downstream stands from the desired speed ratio of adjacent stands;

(b) establishing a second control signal proportional only to the workpiece tension deviations which are produced by said speed ratio deviations;

(c) establishing a modified tension signal by combining said second control signal with the strip tension signal from said tension sensing means; and (d) replacing said strip tension signal with said modified tension signal for use in said tension control means.

2. The method in accordance with claim 1 wherein said second control signal is established in accordance with the relationship, $$dTv = dTdVR * dVR$$

where: 
dTv = speed induced tension change
dVR = (V1 / V2) − (V1R / V2R)
V1 = stand 1 speed
V2 = stand 2 speed
V1R = stand 1 speed reference
V2R = stand 2 speed reference
dTdVR = apparent strip modulus 3. The method in accordance with claim 2 wherein said apparent strip modulus, dTdVR, is established in accordance with the relationship, $$dTdVR = 1/(TERM1 + TERM2)$$

where: 
TERM1 = dH / (h2 * (k − (B + F)/2)) * dG/(dG + dH)
TERM2 = 1 / (4 * U * k) * (dH / R')$^{.5}$
dH = draft at stand 2
U = friction coefficient at stand 2
k = yield stress at stand 2
R' = deformed workroll radius at stand 2
dG = roll gap deflection of stand 2
B = interstand tension
F = exit tension at stand 2
h2 = exit gage at stand 2

4. A method for controlling interstand strip tension in a metal cold rolling mill having at least two rolling stands, each roll stand having at least one pair of opposed workrolls for reducing the thickness of a metal workpiece passed therebetween, tension sensing means for sensing strip tension between adjacent stands, means for sensing the rolling speed of each stand, and means for adjusting the roll gap between opposed workrolls of each stand, the method comprising:

(a) establishing a first control signal proportional to deviations of the actual speed ratio of adjacent upstream and downstream rolling stands from the desired speed ratio of adjacent stands;

(b) establishing a second control signal proportional only to the workpiece tension deviations which are produced by said speed ratio deviations;

(c) combining said second control signal with the interstand tension signal from said tension sensing means to form a modified tension signal;

(d) establishing a tension error signal from the difference between desired interstand tension and said modified tension signal; and (e) adjusting the roll gap of the downstream stand to minimize said tension error signal.

5. The method in accordance with claim 4 wherein said second control signal is established in accordance with the relationship, $$dTv = dTdVR * dVR$$

where: 
dTv = speed induced tension change
dVR = (V1 / V2) − (V1R / V2R)
V1 = stand 1 speed
V2 = stand 2 speed
V1R = stand 1 speed reference
V2R = stand 2 speed reference
dTdVR = apparent strip modulus 6. The method in accordance with claim 5 wherein said apparent strip modulus, dTdVR, is established in accordance with the relationship, $$dTdVR = 1/(TERM1 + TERM2)$$

where: 
TERM1 = dH / (h2 * (k − (B + F)/2)) * dG/(dG + dH)
TERM2 = 1 / (4 * U * k) * (dH / R')$^{.5}$
dH = draft at stand 2
U = friction coefficient at stand 2
k = yield stress at stand 2
R' = deformed workroll radius at stand 2
dG = roll gap load deflection of stand 2
B = interstand tension
F = exit tension at stand 2
h2 = exit gage at stand 2

* * * * *